(12) United States Patent
Kishimoto

(10) Patent No.: US 11,546,672 B2
(45) Date of Patent: Jan. 3, 2023

(54) FRAME EXCHANGE EVALUATION SYSTEM, FRAME EXCHANGE EVALUATION APPARATUS AND PROGRAM

(71) Applicant: DENTSU INC., Tokyo (JP)

(72) Inventor: Wataru Kishimoto, Tokyo (JP)

(73) Assignee: DENTSU INC., Tokyo (JP)

( * ) Notice: Subject to any disclaimer, the term of this patent is extended or adjusted under 35 U.S.C. 154(b) by 0 days.

(21) Appl. No.: 17/424,376

(22) PCT Filed: Jan. 24, 2020

(86) PCT No.: PCT/JP2020/002614
§ 371 (c)(1),
(2) Date: Jul. 20, 2021

(87) PCT Pub. No.: WO2020/153498
PCT Pub. Date: Jul. 30, 2020

(65) Prior Publication Data
US 2022/0116689 A1 Apr. 14, 2022

(30) Foreign Application Priority Data
Jan. 24, 2019 (JP) .............................. JP2019-009940

(51) Int. Cl.
*H04N 21/81* (2011.01)
*H04N 21/24* (2011.01)
*G06Q 30/02* (2012.01)

(52) U.S. Cl.
CPC ........... *H04N 21/812* (2013.01); *H04N 21/24* (2013.01); *G06Q 30/02* (2013.01)

(58) Field of Classification Search
CPC .............................. H04N 21/812; G06Q 30/02
See application file for complete search history.

(56) References Cited

U.S. PATENT DOCUMENTS

| 2006/0168616 A1 | 7/2006 | Candelore |
| 2017/0332133 A1 | 11/2017 | Patten et al. |
| 2018/0293488 A1* | 10/2018 | Dang ............... G06N 3/088 |

FOREIGN PATENT DOCUMENTS

| JP | 2001-357284 | 12/2001 |
| JP | 2002-150107 | 5/2002 |
| WO | 2015-079556 | 6/2015 |

OTHER PUBLICATIONS

Official Communication issued in International Bureau of Wipo Patent Application No. PCT/JP2020/002614, dated Apr. 21, 2020.
Extended European Search Report issued in European Patent Application No. 20744536.2, dated Oct. 21, 2022.

* cited by examiner

*Primary Examiner* — Michael H Hong
(74) *Attorney, Agent, or Firm* — Greenblum & Bernstein, P.L.C.

(57) ABSTRACT

To efficiently evaluate exchange of advertisement frames. A frame exchange evaluation system according to one aspect of the present disclosure includes: a control unit configured to decide a plurality of campaigns that are advertisement frame exchange targets; and an acquisition unit configured to acquire current frame information about each of the campaigns and setting information for frame exchange including information about an allowable predicted audience rating of at least one of the campaigns after the frame exchange; wherein the control unit decides candidates for the frame exchange based on the current frame information and the setting information.

7 Claims, 9 Drawing Sheets

Fig.5

TIME SLOT BIAS[%]

| TIME | MON | TUE | WED | THU | FRI | SAT | SUN |
|------|-----|-----|-----|-----|-----|-----|-----|
| 5 | 10 | 10 | 10 | 10 | 10 | 10 | 10 |
| 6 | 50 | 50 | 50 | 50 | 50 | 50 | 50 |
| 7 | 110 | 110 | 110 | 110 | 110 | 50 | 50 |
| 8 | 80 | 80 | 80 | 80 | 80 | 100 | 110 |
| 9 | 80 | 80 | 80 | 80 | 80 | 70 | 110 |
| 10 | 50 | 50 | 50 | 50 | 50 | 90 | 50 |
| 11 | 50 | 50 | 50 | 50 | 50 | 90 | 110 |
| 12 | 100 | 100 | 100 | 100 | 100 | 110 | 100 |
| 13 | 70 | 70 | 70 | 70 | 70 | 100 | 90 |
| 14 | 70 | 70 | 70 | 70 | 70 | 90 | 90 |
| 15 | 70 | 70 | 70 | 70 | 70 | 90 | 90 |
| 16 | 70 | 70 | 70 | 70 | 70 | 90 | 90 |
| 17 | 90 | 90 | 90 | 90 | 90 | 100 | 100 |
| 18 | 100 | 100 | 100 | 100 | 100 | 100 | 100 |
| 19 | 100 | 100 | 100 | 100 | 100 | 110 | 110 |
| 20 | 110 | 110 | 110 | 110 | 110 | 110 | 100 |
| 21 | 110 | 110 | 120 | 120 | 120 | 120 | 110 |
| 22 | 120 | 120 | 120 | 120 | 120 | 120 | 100 |
| 23 | 100 | 100 | 100 | 100 | 120 | 110 | 110 |
| 24 | 50 | 50 | 50 | 50 | 50 | 50 | 50 |
| 25 | 10 | 10 | 10 | 10 | 10 | 10 | 10 |
| 26 | 10 | 10 | 10 | 10 | 10 | 10 | 10 |
| 27 | 10 | 10 | 10 | 10 | 10 | 10 | 10 |
| 28 | 10 | 10 | 10 | 10 | 10 | 10 | 10 |

PT/SB BIAS [%]

| TIME | PT | SB |
|------|-----|-----|
| 5 | 100 | 80 |
| 6 | 100 | 80 |
| 7 | 100 | 80 |
| 8 | 100 | 80 |
| 9 | 100 | 80 |
| 10 | 100 | 80 |
| 11 | 100 | 80 |
| 12 | 100 | 80 |
| 13 | 100 | 80 |
| 14 | 100 | 80 |
| 15 | 100 | 80 |
| 16 | 100 | 80 |
| 17 | 100 | 80 |
| 18 | 100 | 80 |
| 19 | 110 | 90 |
| 20 | 110 | 90 |
| 21 | 130 | 100 |
| 22 | 130 | 100 |
| 23 | 100 | 80 |
| 24 | 100 | 80 |
| 25 | 100 | 80 |
| 26 | 100 | 80 |
| 27 | 100 | 80 |
| 28 | 100 | 80 |

FRAME EXCHANGE EVALUATION SYSTEM, FRAME EXCHANGE EVALUATION APPARATUS AND PROGRAM

TECHNICAL FIELD

The present disclosure relates to a frame exchange evaluation system, a frame exchange evaluation apparatus and a program.

BACKGROUND ART

In television broadcast, CMs (commercial messages) are broadcast as advertisements. The CMs are roughly classified into time CMs and spot CMs. The time CMs are CMs broadcast in slots that are bought and sold being integrated with a program and may be called program commercial messages, program CMs or sponsor CMs.

The spot CMs correspond to CMs broadcast in CM time slots determined by television stations. The spot CMs are classified into station breaks (SB) broadcast between programs, participations (PT) (or participating CMs) inserted in a program but are not attached with a sponsor display, and the like.

Work for deciding which CM is to be broadcast in which time slot (the work may be called advertisement frame selection, planning or the like) is very complicated work to be decided by a planner, a person in charge of planning management in a broadcasting station (the person may be called a planning desk manager) and the like based on their experience. The planner and the person in charge of planning management are required to, for many existing advertising campaigns, maximize advertising effectiveness of each campaign (for example, GRP (gross rating point), TRP (target rating point), Reach and the like). The planner decides a CM schedule in consideration of an audience rating of a program, a degree of recognition of a CM target product/service, sponsor competition and the like.

Therefore, in order to reduce a burden on the planner and the person in charge of planning management and enhance advertising effectiveness more, a method for automating planning of a CM has been considered (for example, Patent Literature 1).

CITATION LIST

Patent Literature

[Patent Literature 1] Japanese Patent Laid-Open No. 2002-150107

SUMMARY OF THE INVENTION

Technical Problem

There may be cases where, by confirming selection of an optimal advertisement frame inferred from past data, and response after actually performing broadcast, plan modification (change of advertisement frames of CMs) is required for advertisements of a part of sponsors. However, the method described in Patent Literature 1 is such a method that it is started to fill each frame in a state in which any frame is not assigned yet, and it is difficult to use the method when advertisement frames are already assigned.

Therefore, there is a problem that it is not possible to promptly create a modified plan. A method for performing efficient generation, evaluation and the like of a plan of exchange of advertisement frames is required.

Therefore, one of objects of the present disclosure is to provide a frame exchange evaluation system, a frame exchange evaluation apparatus and a program capable of efficiently evaluating exchange of advertisement frames.

Solution to Problem

A frame exchange evaluation system according to one aspect of the present disclosure includes: a control unit configured to decide a plurality of campaigns that are advertisement frame exchange targets; and an acquisition unit configured to acquire current frame information about each of the campaigns and setting information for frame exchange including information about an allowable predicted audience rating of at least one of the campaigns after the frame exchange; wherein the control unit decides candidates for the frame exchange based on the current frame information and the setting information.

Advantageous Effect of Invention

According to an aspect of the present disclosure, it is possible to efficiently evaluate exchange of advertisement frames.

BRIEF DESCRIPTION OF DRAWINGS

FIG. 5 is a diagram showing an example of biases applied to predicted audience ratings.

DESCRIPTION OF EMBODIMENT

Figure 1:
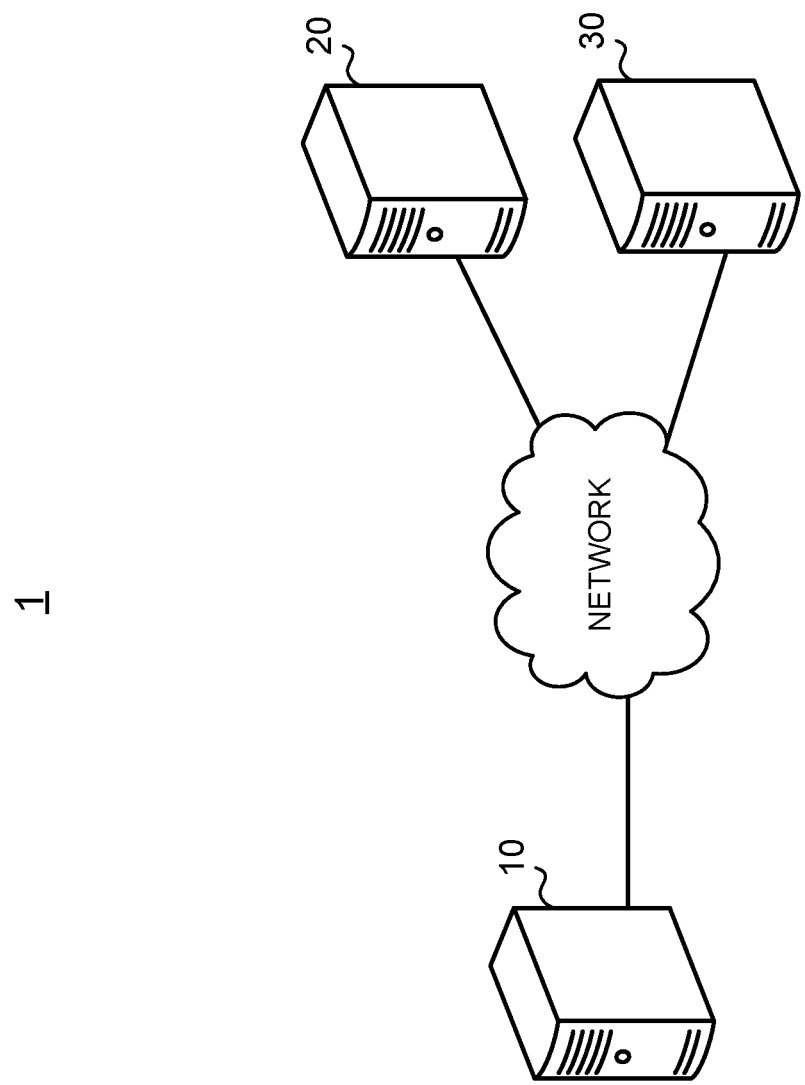
FIG. 1 is a diagram showing an example of a schematic configuration of a frame exchange evaluation system according to one embodiment.

The existing plan modification has the following problems.

Since effects of exchanging advertisement frames are uncertain, the plan modification has to depend on a planner.

Since the planner is required to obtain consent from both of an advertisement frame exchange source sponsor and an exchange destination sponsor, it takes much time until the plan modification is finalized.

Therefore, the inventor got an idea of a mechanism capable of realizing a transaction of sponsors directly exchanging TV CM frames between them.

According to one aspect of the present disclosure, it is possible to favorably generate an advertisement package after frame exchange while confirming fluctuations of advertisement effects in the case of frames being exchanged. Further, by an advertisement frame exchange source sponsor being involved in creation of a frame exchange plan, plan modification can be finalized if consent of an exchange destination sponsor is obtained, and, therefore, it is possible to create a modified plan in a short time.

An embodiment of the present disclosure will be described below in detail with reference to accompanying drawings. In the description below, the same units are given the same reference numerals. Since the same units have the same name and the same function, detailed description will not be repeated.

(Frame Exchange Evaluation System)

FIG. 1 is a diagram showing an example of a schematic configuration of a frame exchange evaluation system according to one embodiment. A frame exchange evaluation system 1 shown in FIG. 1 includes a frame exchange evaluation apparatus 10, a broadcast distribution apparatus 20 and a frame exchange plan approval apparatus 30.

The frame exchange evaluation apparatus 10 is an apparatus that tries to exchange of advertisement frames among a plurality of advertisement campaigns and provides information about an exchange result. The frame exchange evaluation apparatus 10 will also be called merely the evaluation apparatus 10 below.

Note that, in the present disclosure, frame exchange may be replaced with frame rotation or the like.

The evaluation apparatus 10 may be a mobile phone, a smartphone or a mobile terminal (a mobile communication terminal) such as a tablet-type terminal or may be a fixed communication terminal such as a PC (personal computer). In other words, the evaluation apparatus 10 in the present disclosure can be replaced with a communication device.

The evaluation apparatus 10 may communicate with a network (such as the Internet) wiredly and/or wirelessly (for example, LTE (Long Term Evolution), Wi-Fi (registered trademark) and the like).

The broadcast distribution apparatus 20 is an apparatus to distribute broadcast to TVs (televisions). Here, the televisions (television receivers) may be apparatuses having a function of receiving at least one of terrestrial broadcast, broadcasting by BS (Broadcasting Satellite)/CS (Communications Satellite), Internet broadcasting (Internet television) and the like. For example, the televisions may be multi-function televisions, smart TVs, IP (Internet Protocol) TVs, set top boxes or the like.

Note that broadcasting means transmission of telecommunication intended to be directly received by the public, and may include radio broadcasting and Internet broadcasting.

The frame exchange plan approval apparatus 30 is an apparatus that performs a process about approval (consent) of a frame exchange plan outputted by the evaluation apparatus 10. The frame exchange plan approval apparatus 30 will also be called merely the approval apparatus 30 below.

Examples of a functional configuration and a hardware configuration of each of the apparatuses such as the evaluation apparatus 10 will be described later.

Note that the system configuration is a mere example, and the system configuration is not limited thereto. For example, though a configuration in which one apparatus is included for each kind is adopted in FIG. 1, the number of apparatuses for each kind is not limited to one, but a plurality of apparatuses may exist. The frame exchange evaluation system 1 may be configured such that a part of the apparatuses are not included or may be configured such that functions of one apparatus is realized by a plurality of apparatuses.

A configuration is also possible in which functions of a plurality of apparatuses are realized by one apparatus. For example, at least two of the frame exchange evaluation apparatus 10, the broadcast distribution apparatus 20 and the approval apparatus 30 may be implemented on one server.

(Frame Exchange Evaluation Method)

A frame exchange evaluation method according to the embodiment of the present disclosure will be described below. Each frame exchange evaluation method may be applied to the frame exchange evaluation system described above.

<Decision of Frame Exchange Targets>

Figure 2:
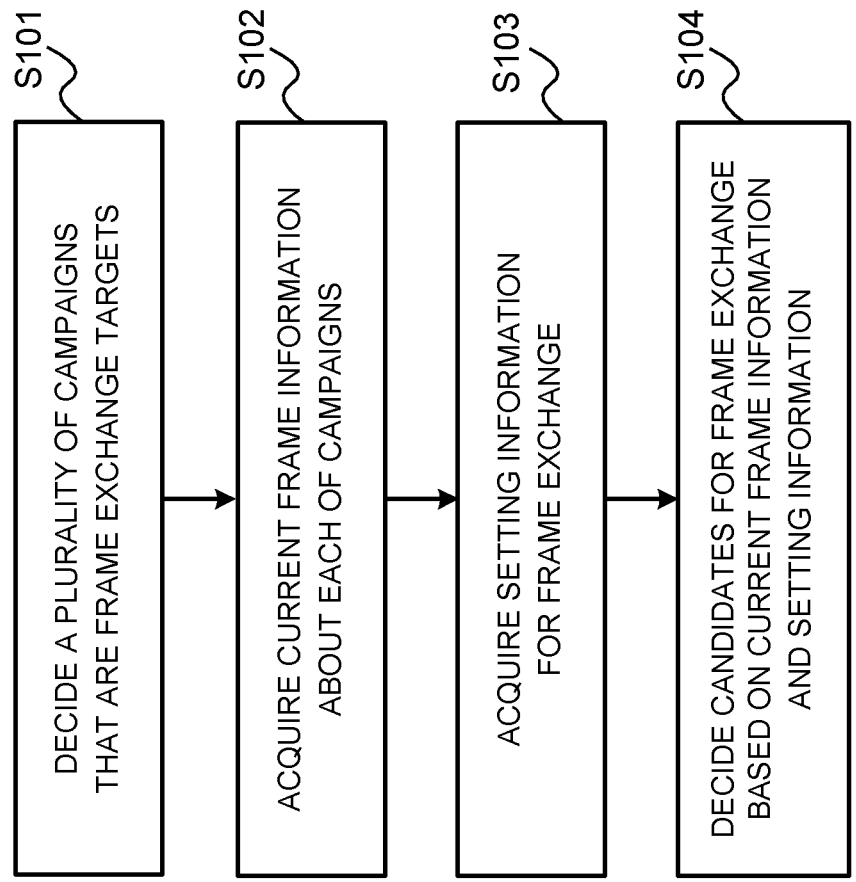
FIG. 2 is a diagram showing an example of a flowchart of a frame exchange target decision method according to the embodiment.

FIG. 2 is a diagram showing an example of a flowchart of the frame exchange target decision method according to the embodiment.

First, the evaluation apparatus 10 decides a plurality of campaigns that are frame exchange targets (step S101). The evaluation apparatus 10 may decide the plurality of campaigns based on an input by a user. The evaluation apparatus 10 may decide an arbitrary plurality of campaigns as the frame exchange targets. In the present disclosure, among the plurality of campaigns, an advertisement frame exchange source campaign is also called a first campaign, and an arbitrary exchange destination campaign is also called a second campaign.

The evaluation apparatus 10 acquires current frame information about each of the campaigns (step S102). The frame information may be based on a CM time table that has been already planned.

Here, the frame information may include information about an advertisement (the information may be called advertisement information, CM information or the like). The advertisement information may include information about content of the advertisement and may show, for example, content of an advertisement target product or service (for example, about whether or not the product or service relates to a medical system, gambling, financing, alcohol, tobacco or the like).

Further, the advertisement information may include information about whether the advertisement of the campaign in the frame is a time CM or a spot CM. The advertisement information may include information about whether the advertisement of the campaign in the frame is SB or PT. Note that, though frame exchange in the present disclosure assumes exchange between spot CMs, frame exchange is not limited thereto.

Further, the advertisement information may include information about a manuscript pattern of the advertisement of the campaign (for example, an inverted L type, an all-day type, an inverted E type, an inverted C-shaped type, an inverted F type, a midnight type, an all-daytime type or the like).

The frame information may include information about a program to which the advertisement is assigned (the information may be called program information). The program information may include, for example, a broadcast date and time (start time, end time, a day of the week, a time length of the program and the like may be included), a time rank (a CM fee rank), a genre of the program, information about content of the program, keywords about the program, a predicted audience rating of the program and the like.

The genre of the program may be, for example, news, entertainment show, drama, movie, music, sports, others or the like. The predicted audience rating may include a predicted audience rating (or an estimated audience rating) calculated based on at least one of a real-time audience rating and a time-shift audience rating or another index such as a buzz coefficient.

The predicted audience rating may include, for example, a predicted audience rating about at least one of TRP (target rating point) corresponding to a total of personal audience ratings of a target layer and GRP (gross rating point) corresponding to a total of household audience ratings. Further, the predicted audience rating may include an audience rating predicting an audience rating which is an all individual audience rating and which is obtained by adding up a real-time audience rating and time-shift audience ratings for seven days after broadcast (the audience rating may be called ALL, P+C7 (program+commercial 7) or the like).

Note that target layers are assumed to correspond to classifications by sex/age used in the field of marketing (the C (child) layer, the T (teen) layer, the M (male) 1 to M3 layers and the F (female) 1 to F3 layers) but are not limited thereto.

The buzz coefficient may be a value indicating how much a target program is talked about (buzzed). The buzz coefficient may be calculated or predicted based on the quantity and/or quality of word of mouth, writing on the Internet and the like about the target program.

The evaluation apparatus 10 acquires setting information for frame exchange (step S103). The evaluation apparatus 10 may acquire the setting information based on an input by the user.

The setting information may include at least one of a frame exchange target period and a period not targeted by frame exchange. The evaluation apparatus 10 may, if a frame corresponds to the frame exchange target period, judge that the frame is exchangeable and, otherwise, judge that the frame is not exchangeable (for example, that this frame has already been decided). Further, the evaluation apparatus 10 may, if a frame corresponds to the period not targeted by frame exchange, judge that the frame is not exchangeable and, otherwise, judge that the frame is exchangeable.

The setting information may include information about an allowable predicted audience rating of each of the campaigns after the frame exchange. The evaluation apparatus 10 may perform control to select (present) such a plan that a predicted audience rating of at least one of the campaigns after the frame exchange does not satisfy the allowable predicted audience rating (the plan may be called a modified plan, a frame exchange plan or the like). Note that the predicted audience rating may be replaced with a sum total of predicted audience ratings of all advertisement frames during a campaign period.

The allowable predicted audience rating may be directly shown by a value or a value range of a predicted audience rating after the frame exchange or may be shown by a difference value or a difference value range based on a predicted audience rating before the frame exchange. For example, the allowable predicted audience rating may show any of GRP, TRP and ALL before the frame exchange is X % or may show any of GRP, TRP and ALL increases or decrease by Y % or more (Y may be any of a positive value, zero and a negative value) based on that before the frame exchange or is included within a range of ±Y % based on that before the frame exchange.

If a plurality of allowable predicted audience ratings are set (for example, if allowable predicted audience ratings are set for GRP and ALL), the setting information may include information about which of the predicted audience ratings is to be selected to be preferentially increased (priority information). For example, if the priority information shows order of GRP and ALL, the evaluation apparatus 10 may perform control to decide such frame exchange that the value of GRP is larger. Note that the priority information may be used merely for prioritization at the time of displaying a frame exchange result without being involved in decision of frame exchange.

The allowable predicted audience rating may be set for one or both of the exchange source campaign and the exchange destination campaign.

The setting information may include information about an (exchange target) program suitable as an exchange destination. The evaluation apparatus 10 may, if a frame corresponds to the information about a program suitable as an exchange destination, judge that the frame is exchangeable and, otherwise, judge that the frame is not exchangeable (for example, that the exchange destination frame has already been decided).

The setting information may include information about the number of frames to be exchanged (the number of exchanged frames). Here, the information may include at least one of the number of frames to be exchanged for the exchange source campaign and the number of frames to be exchanged for the exchange destination campaign. These numbers of frames may be the same (that is, n-to-n exchange may be performed) or may be different (n-to-m (n≠m) exchange may be performed).

Note that the evaluation apparatus 10 may decide default values of various kinds of values included in the setting information, based on a relationship between the exchange source campaign and the exchange destination campaign. The relationship may be, for example, whether the campaigns are for the same or similar industry types (products) or not, how much campaign periods overlap each other, or the like.

Further, the evaluation apparatus 10 may display a screen prompting the user to input values at the time of acquiring the setting information. The evaluation apparatus 10 may display the default values described above first at the time of displaying the screen.

The evaluation apparatus 10 decides candidates for the frame exchange based on the current frame information and the setting information (step S104). The evaluation apparatus 10 may display information about the decided candidates for selection by the user. Note that main target layers may differ between the exchange source campaign and the exchange destination campaign.

For example, consideration will be made on a case where, at step S103, current predicted audience ratings (sum totals of predicted audience ratings of all advertisement frames during the campaign period) of the exchange source campaign are GRP=270.0, ALL=140.5 and TRP=85.0, and current predicted audience ratings (sum totals of predicted audience ratings of all advertisement frames during the campaign period) of the exchange destination campaign are GRP=320.0, ALL=155.0 and TRP=125.5 as an example.

If an allowable predicted audience rating of "increase in GRP by 0% or more" is set for both campaigns, the evaluation apparatus 10 selects such a frame exchange plan that satisfies that GRP of the exchange source campaign is 270.0 or above, and GRP of the exchange destination campaign is 320.0 or above, in the frame exchange target periods of both campaigns.

Note that the evaluation apparatus 10 may display information about what index (predicted audience rating) was selection performed based on in the past for the current exchange source or exchange destination campaign. Since an index to which importance tends to be attached can be presented thereby, it is possible to provide a criterion for selecting a plan for the user.

The evaluation apparatus 10 may automatically generate a frame exchange plan from a past tendency based on a plan for frame exchange candidates decided in the past. In this case, at least a part of steps S101 to S104 may be omitted.

Note that, depending on content of an advertisement, broadcast of the advertisement in a particular time slot may be restricted. The evaluation apparatus 10 may set a relationship between the content of the restricted advertisement and the time slot as the setting information or may hold the information in advance.

The evaluation apparatus 10 may confirm whether broadcast of the exchange source advertisement is restricted in the exchange destination time slot or not based on information about the content of the advertisement in the frame information described above and, if the broadcast is restricted, judge that the exchange is not to be performed. For example, if the exchange source advertisement is an advertisement of alcohol, and broadcast in the exchange destination time slot is restricted, the frame exchange may not be performed.

Note that the plurality of campaigns at step S101 may be three or more campaigns. In this case, as the candidates for frame exchange at step S104, for example, a frame of A Company to B Company, a frame of B Company to C Company, a frame of C Company to A Company, or the like may be presented.

[Frame Attributes]

Note that, though a frame exchange target period and a period not targeted by frame exchange can be set in the frame exchange target decision method described above, a more detailed period may be settable.

As the setting information as shown at step S103, the following frame attributes may be settable:

Released frame ("out")
Desired frame ("in")
Important frame ("importance")
Prohibited frame ("prohibition")
Adjustment frame ("adjustment")

Note that a period to which a frame attribute is applied may be called a zone. For example, a period of the important frame may be called an important frame zone. A plurality of attributes may be set for a certain frame.

The released frame corresponds to a candidate for a frame to be handed over to the counterpart (a frame that is unnecessary or with a low advertisement effect for the user). The important frame is a frame that should not be moved to the counterpart. Even if a certain frame is set as a released frame, the frame is restricted not to be exchanged if the frame also corresponds to an important frame.

The desired frame corresponds to a candidate for a frame desired to be got from the counterpart (a frame that is useful or with a high advertisement effect for the user). The prohibited frame is a frame to which an advertisement does not move from the counterpart (a frame that the counterpart cannot use). Even if a certain frame is set as a desired frame, the frame is restricted so that the counterpart's advertisement does not move to the frame if the frame also corresponds to a prohibited frame.

The adjustment frame is a frame that is used for frame exchange as a spare when it is not possible to perform frame exchange satisfying conditions only with released frames and desired frames.

Note that, when a time slot of a certain frame spreads over a plurality of periods, it may be settable whether or not to cause the frame to be an exchange target.

By using the frame attributes described above, for example, it also becomes possible to, in addition to mutually exchange an advertisement frame A of the first campaign and an advertisement frame B of the second campaign, arrange the advertisement frame A of the first campaign in the advertisement frame B of the second campaign and arrange an advertisement D of the second campaign in an advertisement frame C of the first campaign.

Figure 3:
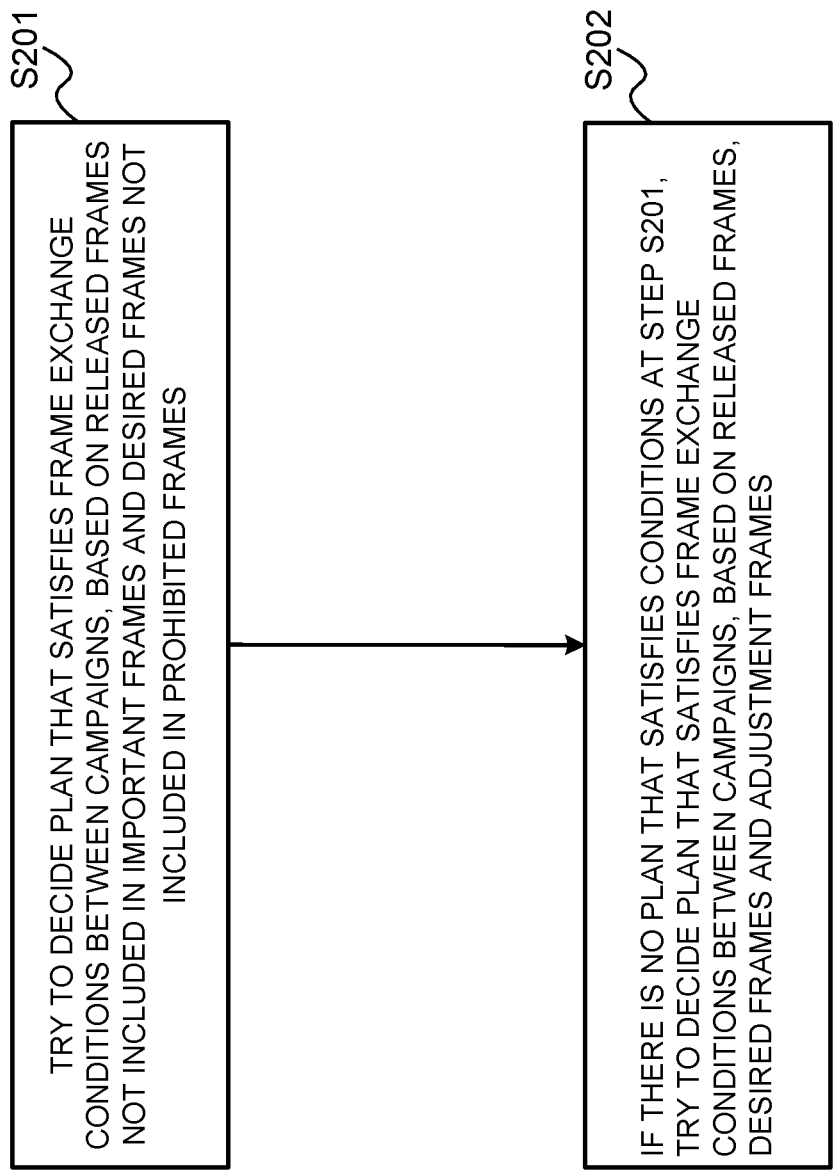
FIG. 3 is a diagram showing another example of the flowchart of the frame exchange target decision method according to the embodiment.

FIG. 3 is a diagram showing another example of the flowchart of the frame exchange target decision method according to the embodiment. This example shows details of step S104 after the frame attributes described above are set at step S103 after step S102 of FIG. 2.

First, the evaluation apparatus 10 tries to decide a plan that satisfies frame exchange conditions between the campaigns, based on released frames not included in important frames and desired frames not included in prohibited frames (step S201). In other words, the evaluation apparatus 10 tries to derive a plan of causing frames included in released frames of the first campaign, corresponding to the number of exchanged frames, to move to frames included in desired frames of the second campaign and causing frames included in released frames of the second campaign, corresponding to the number of exchanged frames, to move to frames included in desired frames of the first campaign. Adjustment frames are not used at this stage.

If there is no plan at step S201, the evaluation apparatus 10 tries to decide a plan that satisfies the frame exchange conditions between the campaigns, based on the released frames, the desired frames and the adjustment frames (step S202). For example, after performing exchange between the released frames and desired frames corresponding to the number of exchanged frames as described at step S201, the evaluation apparatus 10 further performs frame exchange between the adjustment frames between the campaigns to try to derive a plan that satisfies the conditions. In other words, exchange in the adjustment frames may not be counted into the number of exchanged frames.

Note that, at step S202, the released frames may be released frames not included in important frames or may be all released frames including the frames included and not included in the important frames. Further, at step S202, the desired frames may be desired frames not included in prohibited frames or may be all desired frames including the frames included and not included in the prohibited frames. Further, at step S202, the evaluation apparatus 10 may perform frame exchange between the released or desired frames and the adjustment frames.

Figure 4:
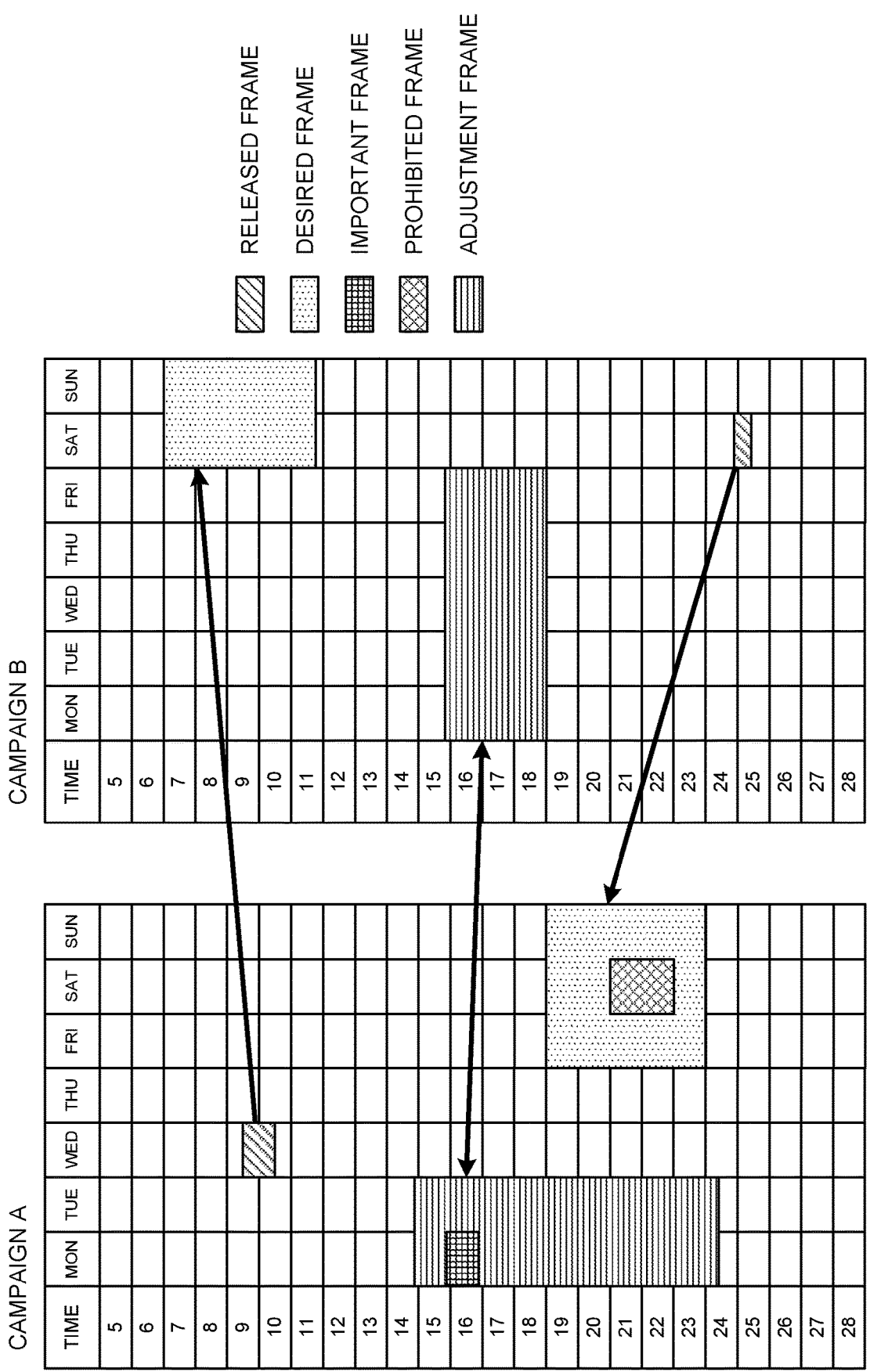
FIG. 4 is a diagram showing an example of frame attributes.

FIG. 4 is a diagram showing an example of the frame attributes. In this example, a time table of a campaign A which is an exchange source and a time table of a campaign B which is an exchange destination are shown.

Time slots corresponding to the frame attributes set for the campaign A are as follows:

Released frames: 9:30 to 10:30 on Wednesday
Desired frames: 19:00 to 24:00 from Friday to Sunday
Important frames: 16:50 to 17:53 on Monday
Prohibited frames: 21:00 to 23:00 on Saturday
Adjustment frames: 14:50 to 24:25 from Monday to Tuesday Further, time slots corresponding to the frame attributes set for the campaign B are as follows:

Released frames: 24:55 to 25:25 on Saturday
Desired frames: 7:00 to 11:45 from Saturday to Sunday Important frames: None
Prohibited frames: None
Adjustment frames: 15:50 to 19:00 from Monday to Friday In the case of this example, the evaluation apparatus 10 searches for a plan that satisfies frame exchange conditions using only a combination of the released frames of the campaign A, the desired frames of the campaign B, the desired frames (excluding the prohibited frames) of the campaign A and the released frames of the campaign B. If the plan exists, advertisements to be broadcast in the released frames of the campaigns A and B, respectively, can be broadcast in their respective desired frames.

If the plan does not exist, the evaluation apparatus 10 may further search for the plan that satisfies the frame exchange conditions, including exchange between the adjustment frames of the campaigns.

[Bias of Predicted Audience Rating]

The predicted audience ratings before and after frame exchange described above may be values to which predetermined biases are applied. For example, the predicted audience ratings may be adjusted in consideration of at least one of an audience attitude, an audience quality and a purchase demand coefficient. In other words, the frame exchange of the present disclosure may be performed based on at least one of the audience ratings (the predicted audience ratings), the audience attitude, the audience quality and the purchase demand coefficient. The evaluation apparatus 10 may evaluate or perform frame exchange based on at least one of the audience ratings (the predicted audience ratings), the audience attitude, the audience quality and the purchase demand coefficient.

The audience attitude (which may be called audience quality or the like) may be indicated by an index indicating how a CM is seen. The audience attitude may be expressed as 1 (or 100%) when a CM is normally viewed by the audience and may be expressed by a value smaller than one in such a case that the CM is not consciously viewed. Further, the audience attitude may be expressed by a value larger than one if the audience is attracted to the CM very much. Note that the audience quality may indicate factors such as who views the CM, how the CM is viewed and the like.

In other words, by broadcasting a CM in a frame with a good audience attitude, it is possible to expect an effect of improvement of a substantial audience rating of the CM.

The audience attitude may be assumed to fluctuate due to conditions as below.

Time slot (a day of the week, and time)
Broadcasting station
Target layer
Type of CM (for example, whether PT or SB)
Program (for example, content of a program)
Campaign (for example, an advertisement target product by a campaign)

For these conditions, a plurality of bias tables may be used. FIG. 5 is a diagram showing an example of biases applied to predicted audience ratings. The left side of FIG. 5 shows an example of a time slot bias that fluctuates according to time slots. For example, the time slot bias may be a value in the case of a CM of a certain campaign being broadcast by a certain broadcasting station, or a different table may be provided for each campaign and for each broadcasting station.

The right side of FIG. 5 shows an example of PT/SB biases corresponding to difference between PT and SB. For example, the PT/SB biases may be values in the case of a CM of a certain campaign being broadcast by a certain broadcasting station, or a different table may be provided at least either for each campaign or for each broadcasting station.

For example, consideration will be made on a case where TRP of a CM broadcast in an SB in a time slot from five o'clock on Monday is X %. When this CM is broadcast by a broadcasting station for which the two kinds of biases shown in FIG. 5 are set, adjusted TRP is X*0.1*0.8=0.08X [%].

The purchase demand coefficient may correspond to a parameter related to a purchase environment, a purchase trend and the like of a product. The purchase demand coefficient may be determined based on at least one of weather (temperature and the like may be included), social data (whether being popular or not), a social situation, a price of a certain product, a price of a certain service and the like.

As an example, the purchase demand coefficient may be determined based on such a relationship that, when a CM of mixed seasoning for cooking using a certain food material (for example, twice-cooked pork seasoning) is broadcast during a period in which the price of the food material (for example, a cabbage) is low, it causes sales of the mixed seasoning for cooking to increase. In such a case, the purchase demand coefficient of the CM of the mixed seasoning for cooking may be expressed by a value larger than one.

For example, in a case where TRP of a CM broadcast in the time slot of five o'clock on Monday is X % during a period in which the purchase demand coefficient of the CM of twice-cooked pork seasoning=1.1, adjusted TRP may be determined as X*1.1=1.1 X [%] if the CM is the CM of twice-cooked pork seasoning.

According to the aspect described above, it is possible to, by considering the audience attitude, the purchase demand coefficient and the like in frame exchange, preferably assign a CM to a more desirable frame.

<Approval of Frame Exchange Targets>

If a frame exchange plan is decided, the evaluation apparatus 10 may transmit the frame exchange plan to the broadcast distribution apparatus 20. The broadcast distribution apparatus 20 may broadcast a CM according to a CM schedule on which a result of the frame exchange plan is reflected. Note that the frame exchange plan may be transmitted via a television advertisement EDI (electronic data interchange) system.

However, a case is conceivable where only one of the exchange source campaign sponsor and the exchange destination campaign sponsor is satisfied with the frame exchange. It is preferable to obtain consents of both sponsors. Further, since influence of a CM on a program is not small, it is more preferable if consent of the frame exchange by a broadcasting station is also obtained.

The evaluation apparatus 10 may transmit information about the decided frame exchange plan to the approval apparatus 30. The approval apparatus 30 may transmit information requesting consent of frame exchange plans received from one or more evaluation apparatuses 10 to apparatuses of related places (at least two of the exchange source campaign sponsor, the exchange destination campaign sponsor, an exchange source broadcasting station and an exchange destination broadcasting station). Further, the approval apparatus 30 may perform control to display a message requesting the consent, for each of the related places.

If receiving the information showing the consent of the frame exchange plan from each of the related places, the approval apparatus 30 may judge that the frame exchange plan has been approved. The approval apparatus 30 may transmit the consented frame exchange plan to the broadcast distribution apparatus 20. The broadcast distribution apparatus 20 may broadcast the CM according to a CM schedule on which a result of the consented frame exchange plan is reflected.

Note that, if receiving a plurality of frame exchange plans from one or more evaluation apparatuses 10, the approval apparatus 30 may generate a new frame exchange plan in consideration of the plurality of frame exchange plans and perform control to obtain consent of each of the related places for the new frame exchange plan.

According to the embodiment described above, it is possible to efficiently evaluate exchange of advertisement frames. As a result, it is possible to make an adjustment so as to dynamically enhance an advertisement effect in each campaign.

<Modification>

The settings (for example, the frame attributes), content of a decided frame exchange plan and the like shown in the embodiment described above may be applied to a time table for another period in an advertisement campaign period (for example, all the period) or may be applied to a time table for another broadcasting station (for example, an affiliated station).

Figure 6:
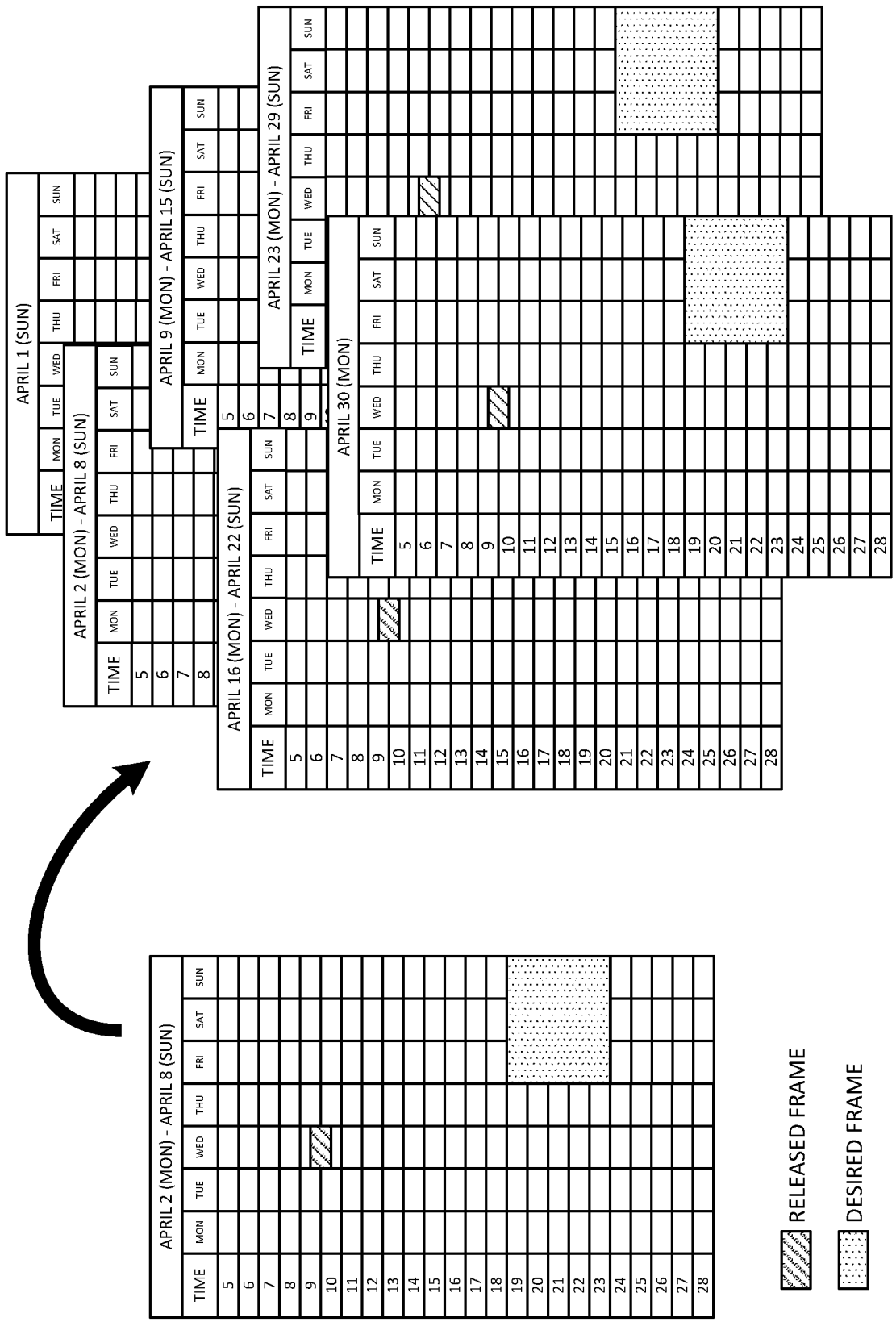
FIG. 6 is a diagram showing an example of applying frame attributes to time tables of all periods.

FIG. 6 is a diagram showing an example of applying frame attributes to time tables of all the period. In this example, it is assumed that the campaign period is one month of April. Further, it is assumed that a time table for one week from April 2 (Monday) to April 8 (Sunday) in the period is used as a representative.

The evaluation apparatus 10 may apply frame attributes set for the time table to time tables for weeks other than the representative week. Further, the evaluation apparatus 10 may apply a frame exchange plan decided for the representative week to the time tables for the weeks other than the representative week.

Figure 7:
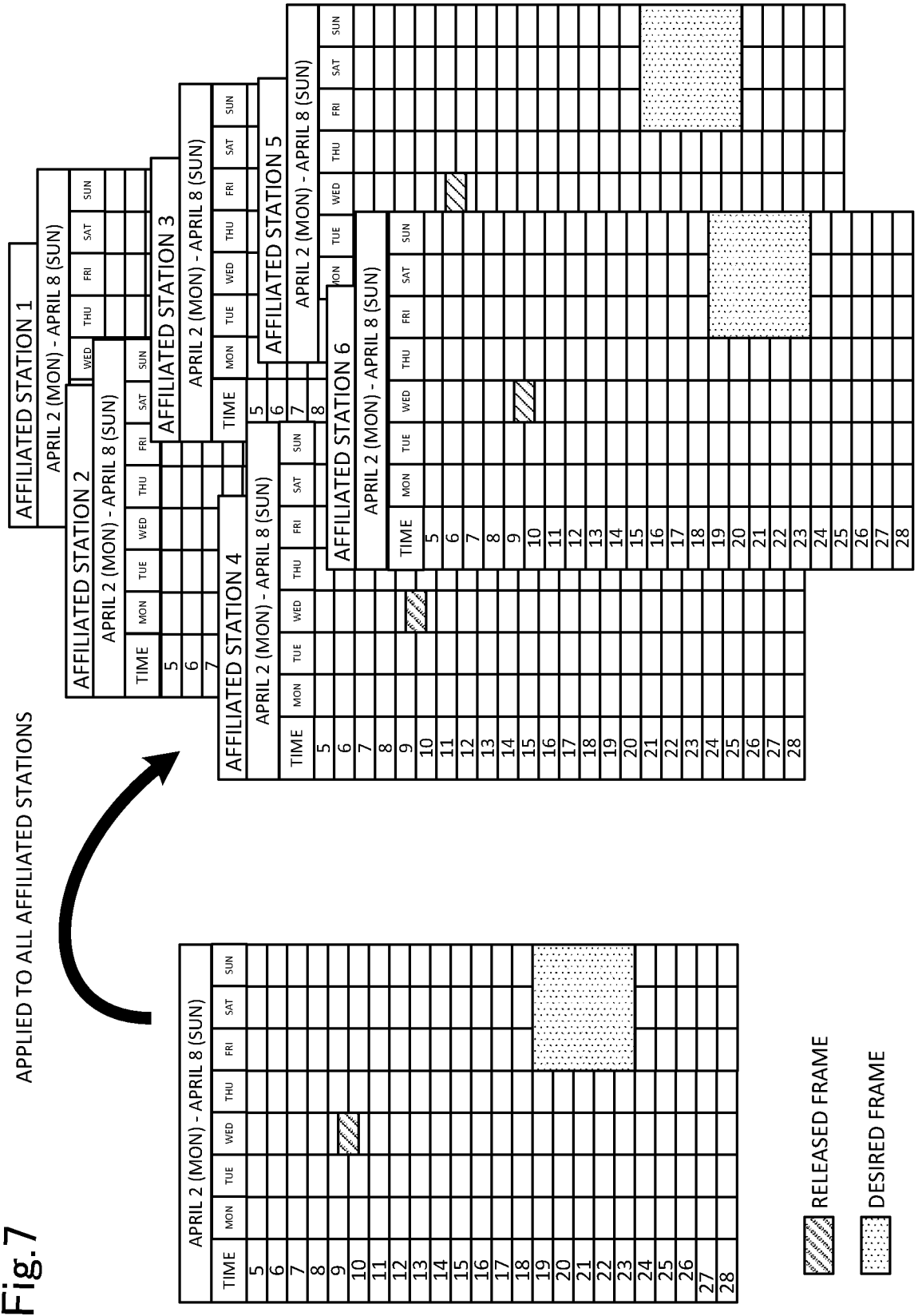
FIG. 7 is a diagram showing an example of applying the frame attributes to time tables of all affiliated broadcasting stations.

FIG. 7 is a diagram showing an example of applying the frame attributes to time tables of all affiliated broadcasting stations. Assumptions similar to those for FIG. 6 are applied.

The evaluation apparatus 10 may apply the frame attributes set for the time table to a time table of another affiliated station 1-6 for the same week as the representative week. Further, the evaluation apparatus 10 may apply a frame exchange plan decided for the representative week to the time table of the other affiliated station 1-6 for the same week as the representative week.

According to the configuration of the modification, since it is possible to use content set for or frame exchange decided for a certain period, for another period or another station, it is possible to promptly create a modified plan.

(Configuration of Apparatus)

Figure 8:
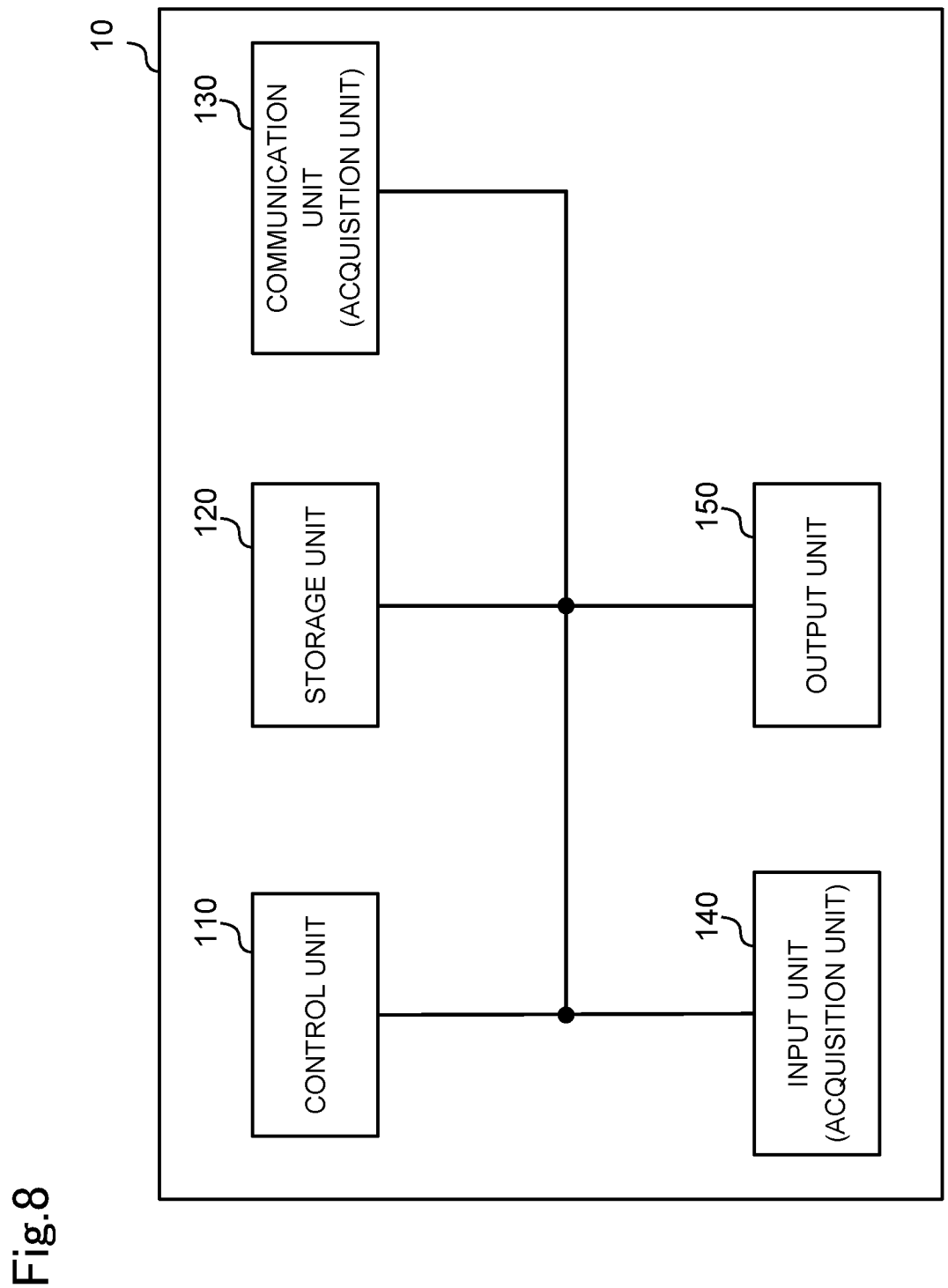
FIG. 8 is a diagram showing an example of a functional configuration of an evaluation apparatus according to the embodiment.

FIG. 8 is a diagram showing an example of a functional configuration of an evaluation apparatus according to the embodiment. As shown in this example, the evaluation apparatus 10 has a control unit 110, a storage unit 120, a communication unit 130, an input unit 140 and an output unit 150. Note that functional blocks of characteristic parts of the present embodiment are mainly shown in FIG. 8, and the evaluation apparatus 10 may have other functional blocks required for other processes. Further, a configuration in which a part of the functional blocks are not included may be adopted.

The control unit 110 performs control of the evaluation apparatus 10. The control unit 110 can be configured with a controller, a control circuit or a control device that is described based on common recognition in the technical field of the present disclosure.

The storage unit 120 stores (holds) information used in the evaluation apparatus 10. The storage unit 120 can be configured with a memory, a storage, a storage device or the like that is described based on common recognition in the technical field of the present disclosure.

The communication unit 130 performs communication with other communication devices (equipment, servers and the like) via a network. The communication unit 13 may output received various information to the control unit 110.

The communication unit 130 can be configured with a transmitter/receiver, a transmission/reception circuit or a transmission/reception device that is described based on common recognition in the technical field of the present disclosure. Note that the communication unit 130 may be configured with a transmission unit and a reception unit.

The input unit 140 accepts an input by an operation from the user. Further, the input unit 140 may be connected to predetermined equipment, a storage medium and the like to accept input of data. The input unit 140 may output an input result, for example, to the control unit 110.

The input unit 140 can be configured with an input device such as a keyboard, a mouse, buttons and the like, an input/output terminal and an input/output circuit or the like described based on common recognition in the technical field of the present disclosure. Further, the input unit 140 may be configured, being integrated with a display unit (for example, a touch panel).

The output unit 150 performs output of data, content and the like in a format perceptible to the user. For example, the output unit 150 may be configured, including the display unit to display an image, a sound output unit to output sound, and the like.

The display unit can be configured with a display device such as a display and a monitor that is described based on common recognition in the technical field of the present disclosure. The sound output unit can be configured with an output device such as a speaker that is described based on common recognition in the technical field of the present disclosure.

The output unit 150 can be configured, including an arithmetic unit, an arithmetic circuit, an arithmetic device, a player, an image/video/sound processing circuit, an image/video/sound processing device, an amplifier and the like described based on common recognition in the technical field of the present disclosure.

Note that the control unit 110 may perform a process based on the steps shown in FIG. 2, FIG. 3 and the like. For example, the control unit 110 may decide a plurality of campaigns that are advertisement frame exchange targets.

The communication unit 130 or the input unit 140 may be called an acquisition unit. For the plurality of campaigns, the acquisition unit may acquire current frame information about each of the campaigns. Further, the acquisition unit may acquire setting information for frame exchange, including information about an allowable predicted audience rating of at least one campaign after frame exchange (an exchange source or exchange destination campaign).

The control unit 110 may decide candidates for the frame exchange (a frame exchange plan) based on the current frame information and the setting information. For example, the control unit 110 may decide the candidates so that a predicted audience rating of each campaign after the frame exchange satisfies the allowable predicted audience rating.

The control unit 110 may decide the candidates based on released frames not included in important frames and desired frames not included in prohibited frames. Here, the released frames may correspond to candidates for frames to be handed over to the frame exchange counterpart; the important frames may correspond to frames not to be moved to the counterpart; the desired frames may correspond to candidates for frames desired to be given from the counterpart; and the prohibited frames may correspond to frames that do not move from the counterpart.

The control unit 110 may decide the candidates based on the released frames, the desired frames and adjustment frames. Here, the adjustment frames may correspond to frames used for the frame exchange when it is not possible to decide the candidates only with the released frames (released frames not included in the important frames) and the desired frames (desired frames not included in the prohibited frames).

The control unit 110 may not count the number of frame exchanges in the adjustment frames as the number corresponding to the number of exchanged frames specified by the setting information. The control unit 110 may decide frame exchange candidates using the adjustment frames irrespective of the number of exchanged frames specified by the setting information.

Each of the broadcast distribution apparatus 20, the approval apparatus 30 and the like may have a configuration similar to the configuration of FIG. 8. One skilled in the art can appropriately replace and understand the description related to the evaluation apparatus 10 in the explanation of FIG. 8.

Some units will be illustratively described below. Note that a reference numeral of a device corresponding to each functional block of FIG. 8 is shown by applying a first-digit numeral of a reference numeral indicating the device (for example, in the case of the broadcast distribution apparatus 20, "2" at the first digit of "20") to the first-digit numeral in FIG. 8.

A communication unit 230 of the broadcast distribution apparatus 20 may receive a decided frame exchange plan from the evaluation apparatus 10. The communication unit 230 of the broadcast distribution apparatus 20 may receive a consented frame exchange plan from the approval apparatus 30. A control unit 210 of the broadcast distribution apparatus 20 may decide a CM to be broadcast in a predetermined time slot according to a CM schedule on which a result of the frame exchange plan is reflected. The communication unit 230 of the broadcast distribution apparatus 20 may distribute (transmit) the CM.

A communication unit 330 of the approval apparatus 30 may receive a decided frame exchange plan from the evaluation apparatus 10. A control unit 310 of the approval apparatus 30 may perform a process for obtaining consent from each of related places (at least two of an exchange source campaign sponsor, an exchange destination campaign sponsor, an exchange source broadcasting station and an exchange destination broadcasting station). The communication unit 330 of the approval apparatus 30 may transmit the consented frame exchange plan to the broadcast distribution apparatus 20.

(Hardware Configuration)

The block diagram used to describe the above embodiment shows blocks according to functions. Each of these functional blocks (components) is realized by an arbitrary combination of hardware and/or software. Further, means for realizing each functional block is not especially limited. Each functional block may be realized by one device that is physically combined or may be realized by two or more devices that are physically separated but are wiredly or wirelessly connected.

Figure 9:
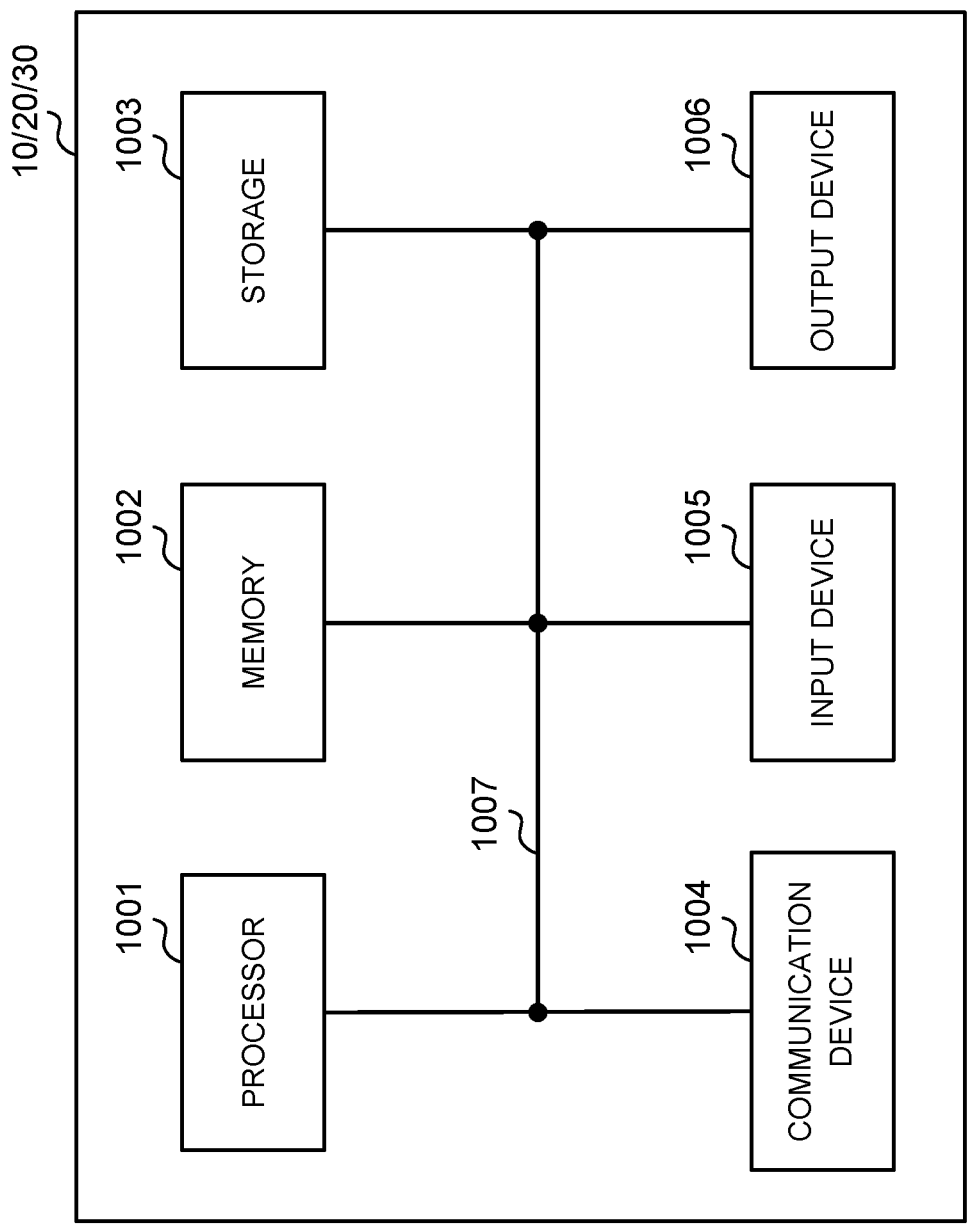
FIG. 9 is a diagram showing an example of a hardware configuration of the evaluation apparatus and the like according to the embodiment.

For example, an apparatus (the evaluation apparatus 10 or the like) in the embodiment of the present disclosure may function as a computer to perform the process of the frame exchange evaluation method of the present disclosure. FIG. 9 is a diagram showing an example of a hardware configuration of the evaluation apparatus and the like according to the embodiment. Physically, each of the evaluation apparatus 10, the broadcast distribution apparatus 20 and the like described above may be configured as a computer apparatus including a processor 1001, a memory 1002, a storage 1003, a communication device 1004, an input device 1005, an output device 1006, a bus 1007 and the like.

Note that, in the present disclosure, the terms "apparatus", "circuit", "device", "unit", "server" and the like can be replaced with one another. The hardware configuration of the evaluation apparatus 10, the broadcast distribution apparatus 20 and the like may be made so as to include, for each of the devices shown in FIG. 11, one or more, or may be configured without including a part of the devices.

For example, though only one processor 1001 is shown, there may be a plurality of processors. Further, a process may be executed by one processor or may be executed by two or more processors at the same time, sequentially, or using other methods. Note that the processor 1001 may be implemented with one or more chips.

Each function of the evaluation apparatus 10, the broadcast distribution apparatus 20 and the like is realized by causing predetermined software (a program) to be read on hardware such as the processor 1001 and the memory 1002, and thereby the processor 1001 performs an arithmetic operation to control communication by the communication device 1004, reading and/or writing of data on the memory 1002 and the storage 1003, and the like.

For example, the processor 1001 causes an operating system to operate and controls the whole computer. The processor 1001 may be configured with a CPU (central processing unit) that includes interfaces with peripheral devices, a control device, an arithmetic operation device, registers and the like. Note that each unit such as the control unit 110 described above may be realized by the processor 1001.

Further, the processor 1001 reads a program (a program code), a software module, data or the like from at least one of the storage 1003 and the communication device 1004 onto the memory 1002 and executes various kinds of processes according thereto. As the program, a program to cause a computer to execute at least a part of the operations described in the above embodiment is used. For example, the control unit 110 may be realized by a control program that is stored in the memory 1002 and operates on the processor 1001, and the other functional blocks may be similarly realized.

The memory 1002 is a computer-readable recording medium and may be configured, for example, with at least one of a ROM (read-only memory), an EPROM (erasable programmable ROM), an EEPROM (electrically EPROM), a RAM (random access memory) and other appropriate storage media. The memory 1002 may be called a register, a cache, a main memory (a main storage device) or the like. The memory 1002 can store a program (a program code), a software module or the like that can be executed to implement the method according to the embodiment.

The storage 1003 is a computer-readable recording medium and may be configured, for example, with at least one of a flexible disk, a floppy (registered trademark) disk, a magneto-optical disk (for example, a compact disc (a CD-ROM (compact disc ROM) and the like), a digital versatile disc and a Blu-ray (registered trademark) disk), a removable disk, a hard disk drive, a smart card, a flash memory device (for example, a card, a stick and a key drive), a magnetic stripe, a database, a server and other appropriate storage media. The storage 1003 may be called an auxiliary storage device. Note that the storage unit 120 described above may be realized by the memory 1002 and/or the storage 1003.

The communication device 1004 is hardware (a transmission/reception device) for performing communication between computers via at least one of a wired network and a wireless network and is also referred to, for example, as a network device, a network controller, a network card, a communication module or the like. The communication device 1004 may include a SIM card. Note that the communication unit 130 described above may be realized by the communication device 1004.

The input device 1005 is an input device (for example, a keyboard, a mouse and the like) to accept an input from outside. The output device 1006 is an output device (for example, a display, a speaker and the like) to perform output to the outside. Note that the input device 1005 and the output device 1006 may be integrally configured (for example, a touch panel). Note that the input unit 140 and the output unit 150 described above may be realized by the input device 1005 and the output device 1006, respectively.

Further, the devices such as the processor 1001 and the memory 1002 are connected via the bus 1008 for communicating information. The bus 1007 may be configured with a single bus or may be configured with different buses among the devices.

Further, each of the evaluation apparatus 10, an advertisement distribution server 50 and the like may be configured, including hardware such as a microprocessor, a DSP (digital signal processor), an ASIC (application specific integrated circuit), a PLD (programmable logic device) and an FPGA (field programmable gate array), and a part or all of each functional block may be realized by the hardware. For example, the processor 1001 may be at least one of these pieces of hardware.

(Modification)

Note that the terms described in the present disclosure and/or terms required to understand the present disclosure may be replaced with terms having the same or similar meanings.

The information, parameters and the like described in the present disclosure may be expressed using absolute values, expressed using relative values from predetermined values, or expressed with corresponding different information. Further, names used for parameters and the like in the present disclosure are not limiting in any respect.

The information, signals and the like described in the present disclosure may be those expressed using any of various different techniques. For example, data, an instruction, a command, information, a signal, a bit, a symbol, a chip and the like that can be mentioned through the whole description above may be indicated by a voltage, a current, an electromagnetic wave, a magnetic field or a magnetic particle, a light field or a photon, or an arbitrary combination thereof.

Information, signals and the like may be inputted/outputted via a plurality of network nodes. The inputted/outputted information, signals and the like may be stored in a particular place (for example, a memory) or managed using tables. For the inputted/outputted information, signals and the like, overwriting, update or addition can be performed. The outputted information, signals and the like may be deleted. The inputted information, signals and the like may be transmitted to other apparatuses.

Further, notification of predetermined information (for example, a notification of "being X") is not limited to an explicit notification but may be suggestively performed (for example, by not performing notification of the predetermined information or by notifying different information).

Software should be broadly interpreted to mean an instruction, an instruction set, a code, a code segment, a program code, a program, a subprogram, a software module, an application, a software application, a software package, a routine, a subroutine, an object, an executable file, an execution thread, a procedure, a function and the like no matter whether it is called software, firmware, middleware, a microcode or a hardware description language or it is called by other names.

Further, software, instructions, information and the like may be transmitted/received via a transmission medium. For example, when software is transmitted from a website, a server or other remote sources using at least one of wired technology (a coaxial cable, an optical fiber cable, a twisted pair, a DSL (digital subscriber line) and the like) and wireless technology (infrared rays, microwaves and the like), at least one of the wired technology and the wireless technology is included in the definition of a transmission medium.

The terms "system" and "network" used in the present disclosure can be interchangeably used.

The each of the aspects/embodiment described in the present disclosure may be used alone, or the aspects/embodiment may be used in combination or used by being switched at the time of implementation. Further, order of the process procedures, sequences, flowcharts and the like of the aspects/embodiment described in the present disclosure may be changed unless there is a contradiction. For example, the method described in the present disclosure presents various step elements in illustrative order and is not limited to the presented particular order.

The expression "based on" used in the present disclosure does not mean "based on only" unless otherwise stated. In other words, the expression "based on" means both of "based on only" and "at least based on".

Reference to elements using names accompanied by "first", "second" and the like which are used in the present disclosure does not generally limit the quantities or order of the elements. These names can be used in the present disclosure as a convenience method for distinguish two or more elements. Therefore, reference to a first and second elements does not mean that only the two elements can be adopted or that the first element must be prior to the second element in some form.

In the present disclosure, when "include", "including" and forms changed therefrom are used, these words are intended to be inclusive similarly to the term "comprising". Furthermore, the word "or" used in the present disclosure is intended not to be an exclusive OR.

In the present disclosure, for example, when an article is added by translation like "a", "an" and "the" in English, the present disclosure may include a case where nouns following these articles are in plural forms.

An invention according to the present disclosure has been described in detail above. It is apparent to one skilled in the art that the invention according to the present disclosure is not limited to the embodiment described in the present disclosure. The invention according to the present disclosure can be implemented as modified and changed aspects without departing from the spirit and scope of the invention determined based on description of Claims. Therefore, the description of the present disclosure is intended to give an illustrative explanation and does not give any restrictive meaning to the invention according to the present disclosure.

The present application is based on Japanese Patent Application No. 2019-9940 filed on Jan. 24, 2019, the content of which is hereby incorporated in its entirety.

The invention claimed is:

1. A frame exchange evaluation system comprising:
   a controller configured to decide a plurality of campaigns that are targets for frame exchange of advertisement; and
   an acquirer configured to acquire current frame information about each of the plurality of campaigns and setting information for the frame exchange that includes information about an allowable predicted audience rating after the frame exchange of at least one of the plurality of campaigns,
   wherein the controller decides candidates for the frame exchange from the plurality of campaigns based on the current frame information and the setting information,
   wherein the candidates for the frame exchange include a plan that indicates one or more frames to be exchanged for a campaign out of the plurality of campaigns and one or more frames to be exchanged for another campaign out of the plurality of campaigns, and
   wherein a predicted audience rating of the campaign is a sum total of predicted audience ratings of all advertisement frames of the campaign during a campaign period of the campaign.

2. The frame exchange evaluation system according to claim 1, wherein the controller decides the candidates for the frame exchange so that the predicted audience rating of each of the campaigns after the frame exchange satisfies the allowable predicted audience rating.

3. The frame exchange evaluation system according to claim 1,
   wherein the controller decides the candidates for the frame exchange based on released frames not included in important frames and desired frames not included in prohibited frames; and
   wherein the released frames correspond to candidates for frames to be handed over to a frame exchange counterpart; the important frames correspond to frames not to be moved to the counterpart; the desired frames correspond to candidates for frames desired to be given from the counterpart; and the prohibited frames correspond to frames that do not move from the counterpart.

4. The frame exchange evaluation system according to claim 3,
   wherein the controller decides the candidates for the frame exchange based on the released frames, the desired frames and adjustment frames; and
   wherein the adjustment frames correspond to frames used for the frame exchange when it is not possible to decide the candidates for the frame exchange only with the released frames and the desired frames.

5. The frame exchange evaluation system according to claim 4, wherein the controller does not count the number of frame exchanges in the adjustment frames as the number corresponding to the number of exchanged frames specified by the setting information.

6. A frame exchange evaluation apparatus comprising:
   a controller configured to decide a plurality of campaigns that are targets for frame exchange of advertisement; and
   an acquirer configured to acquire current frame information about each of the plurality of campaigns and setting information for the frame exchange that includes information about an allowable predicted audience rating after the frame exchange of at least one of the plurality of campaigns,
   wherein the controller decides candidates for the frame exchange from the plurality of campaigns based on the current frame information and the setting information,
   wherein the candidates for the frame exchange include a plan that indicates one or more frames to be exchanged for a campaign out of the plurality of campaigns and one or more frames to be exchanged for another campaign out of the plurality of campaigns, and
   wherein a predicted audience rating of the campaign is a sum total of predicted audience ratings of all advertisement frames of the campaign during a campaign period of the campaign.

7. A non-transitory computer-readable medium containing a program for causing a computer to execute:
   a procedure for deciding a plurality of campaigns that are targets for frame exchange of advertisement;
   a procedure for acquiring current frame information about each of the plurality of campaigns and setting information for the frame exchange that includes information about an allowable predicted audience rating after the frame exchange of at least one of the plurality of campaigns; and
   a procedure for deciding candidates for the frame exchange from the plurality of campaigns based on the current frame information and the setting information,
   wherein the candidates for the frame exchange include a plan that indicates one or more frames to be exchanged for a campaign out of the plurality of campaigns and one or more frames to be exchanged for another campaign out of the plurality of campaigns, and
   wherein a predicted audience rating of the campaign is a sum total of predicted audience ratings of all advertisement frames of the campaign during a campaign period of the campaign.

* * * * *